United States Patent [19]

Endrizzi

[11] 4,284,453

[45] Aug. 18, 1981

[54] METHOD OF IMPARTING COLOR HIGHLIGHTS OR SHADOWS TO A TEXTURED DECORATIVE LAMINATE

[75] Inventor: Gilbert D. Endrizzi, Wisconsin Rapids, Wis.

[73] Assignee: Consolidated Papers, Inc., Wisconsin Rapids, Wis.

[21] Appl. No.: 76,402

[22] Filed: Sep. 17, 1979

Related U.S. Application Data

[63] Continuation-in-part of Ser. No. 868,718, Jan. 11, 1978, abandoned.

[51] Int. Cl.³ .............................................. B32B 31/00
[52] U.S. Cl. ..................................... 156/154; 156/220; 156/241; 156/245; 156/278; 156/288; 264/139; 264/246; 427/264; 428/151
[58] Field of Search ................. 156/61, 154, 220, 240, 156/234, 238, 241, 230, 278, 288, 245; 427/274, 277, 264; 264/220, 258, 139, 246; 428/151

[56] References Cited

U.S. PATENT DOCUMENTS

| 1,608,281 | 11/1926 | Weber | 427/277 X |
| 1,612,714 | 12/1926 | Geyer | 156/61 |
| 1,909,514 | 5/1933 | Assael | 156/230 X |
| 2,811,744 | 11/1957 | Baldanza | 156/541 X |
| 3,303,081 | 2/1967 | Michaelson et al. | 156/219 |
| 3,690,912 | 9/1972 | Nuzum | 427/368 X |
| 3,847,646 | 11/1974 | Daunheimer et al. | 427/368 |

Primary Examiner—William A. Powell
Assistant Examiner—Thomas E. Bokan
Attorney, Agent, or Firm—Gary, Juettner & Pyle

[57] ABSTRACT

A contrasting color is imparted to the decorative surface of a decorative laminate by inserting a pigment coated release sheet between the molding caul and the decorative surface during the molding operation, with the pigment facing the decorative surface. Upon application of heat and pressure during the formation of the laminate, color is transferred from the release sheet to the decorative surface. A suitable technique is also used to emboss or impart surface texture to the decorative surface during molding. Thereafter, the textured surface is subjected to rubbing or brushing to remove more color from the embossed or raised areas than the debossed areas, thereby highlighting or imparting a shaded effect to the textured surface.

8 Claims, No Drawings

METHOD OF IMPARTING COLOR HIGHLIGHTS OR SHADOWS TO A TEXTURED DECORATIVE LAMINATE

RELATED APPLICATION

This is a continuation-in-part of copending application Ser. No. 868,718, abandoned, filed Jan. 11, 1978.

BACKGROUND OF THE INVENTION

This invention relates generally to the production of decorative plastic laminates, which are extensively used in making furniture, counter tops, paneling and other decorative or functional surfaces.

The art of making such laminates is well known. A plurality of sheets of resin impregnated kraft paper are stacked together to form a core or backing. The resin employed is a heat curable type such as phenol formaldehyde. A decorative sheet of paper having a printed design or solid color and impregnated with a melamine resin is laid over the core, and an overlay sheet, usually melamine impregnated alpha cellulose paper, is superimposed over the decorative sheet. In some instances, especially where the final product is of solid color, the overlay sheet may be omitted. A panel of particle board may be substituted for the core sheets.

The foregoing assembly of resin impregnated sheets is subjected to heat and compression by confining the same between heated press plates or molding cauls such that the sheets become firmly adhered to one another as the resin cures. A release sheet composed of relatively non-adhereable paper, plastic film or aluminum foil is interposed between the decorative surface and the caul to prevent adhesion between the caul and the decorative surface.

Various techniques have been developed for applying a textured surface to the decorative surface of such laminates. U.S. Pat. No. 1,742,516 describes a process wherein a design or letter is embossed in a laminate by using an engraved caul having the design debossed therein. U.S. Pat. No. 1,997,358 and No. 2,133,081 describe the texturizing of plastic laminates utilizing an embossed metal caul.

Inasmuch as engraved or embossed metal cauls are expensive to produce and have a short life span, subsequent efforts have been directed primarily toward substitute methods. U.S. Pat. No. 2,606,855 discloses a process of using a master to make a number of textured caul plates from a stack of resin impregnated paper. Similar techniques utilizing embossed or debossed plastic laminates as molding cauls are described in U.S. Pat. No. 3,303,081 and No. 3,311,520. U.S. Pat. No. 3,373,068 describes the use of particulate matter on the decorative sheet to impart texture thereto.

In my U.S. Pat. No. 3,616,011 there is described another method for making a textured molding caul wherein a textured original is sandwiched between a pair of thin flexible resin impregnated sheets. The sheets are forced intimately into the surface recesses of the original and the resin is cured. Thereafter, the resin-set sandwich of the original and the sheets are used as a master molding caul.

Often it is desirable to produce a laminate that simulates another product, a good example being a wood grained surface. In such a case, it has been possible to use a decorative sheet having a colored wood grain printed thereon, and the decorative surface may also be textured during the subsequent molding process. It is not usually possible or convenient, however, to impart a texture conforming to the print pattern, and the resulting product does not have the combined texture and appearance of a naturally stained wood wherein the grain is highlighted by differential absorption of the stain into the grain, saw marks or depressed areas of the wood.

SUMMARY OF THE INVENTION

The present invention represents a further improvement in the production of textured decorative laminates, which allows for greater realism, warmth and a contrasting textural quality heretofore not attainable.

In the production of a textured decorative laminate, a release sheet having a coating of pigment thereon is applied over the decorative surface before the laminate is pressurized against a textured molding caul. The release sheet may be composed, for example, of a sheet of polymeric material having a thin layer of ink applied substantially uniformly on the surface against which the panel or laminate is to be molded.

As the laminate is pressurized and heated, the pigment is uniformly transferred to the texturized surface, the color of the pigment being selected so as to contrast with the color of the decorative sheet.

After the lamination has been completed, the release sheet is removed to expose a textured surface that is substantially uniformly colored by the pigment. The decorative surface is then subjected to surface rubbing, brushing or light abrasion to the extent necessary to remove color from the raised or embossed portions while allowing more color to remain in the depressed or debossed areas, thus highlighting or shadowing the texture and providing added visual dimension to the appearance of the textured surface.

It is believed that a portion of the transferred pigment is absorbed into the decorative surface during the application of heat and pressure, particularly into the debossed areas, and any pigment not removed by the subsequent rubbing has a high degree of adherence to the product. Equivalent results are not achieved by the application of liquid pigment to the relatively non-porous surface of a finished laminate followed by surface rubbing.

DESCRIPTION OF THE PREFERRED EMBODIMENT

In order to carry out the process of the present invention, any of the well known methods of making textured laminates may be employed. A variety of textures are possible, such as wood grain, fabric, decorative objects, writing or printing, as well as many others. The process of making the textured laminate from a textured caul is conventional, and the present invention resides in imparting color highlights to the textured surface.

The core sheets or other suitable backing, decorative sheet and overlay sheet, as well as the resins used to impregnate such sheets and the processing conditions, follow conventional practices such as described in the foregoing patents, which are incorporated herein by reference. In the conventional process, the core is made up from a plurality of resin impregnated kraft sheets. These sheets are normally impregnated with a phenolic resin, allowed to at least partially dry, and then stacked in a superimposed relation. The number of sheets utilized may vary and ordinarily the number will vary between three and six. Other core materials, such as particle board, may be used. Immediately above the core sheet assembly or backing there is positioned a resin impregnated decorative sheet, which in the case of the preferred embodiment will be a sheet having color, printing, or other decoration thereon, for example, printing that resembles a grained wood panel. Superimposed above the print sheet in many cases is a protective overlay sheet of fine paper such as alpha cellulose. The overlay and print sheet are impregnated with a heat curable resin, preferably with a noble thermosetting resin such as melamine formaldehyde resin or the like. In the alternative, the decorative sheet may be replaced by metal foil.

In accordance with conventional practices, the sandwich of the aforesaid materials is placed between a pair of rigid caul plates. The caul plate facing the decorative sheet is provided with a desired textured surface by any of the well known and conventional methods, and a release sheet is placed between the caul and the outer sheet of the laminate. The assembly is placed in a heated press, and the sandwich is subjected to heat and pressure for a time sufficient to cure the resin in the laminate, i.e., typically 500 to 2,000 p.s.i., 200° to 400° F., and 15 to 60 minutes. The resulting product is a rigid laminate having a hard, durable decorative and textured surface.

In the preferred embodiment, the textured caul is prepared by any suitable method. For example, the caul plate may be a rigid metal plate with any desired texture etched thereon by conventional methods.

Another suitable method for preparing a textured caul plate is described in U.S. Pat. No. 3,616,011. As described in this patent, a consumable original textured panel or sheet is sandwiched between a pair of resin impregnated or resin containing overlay sheets of a size slightly larger than the original. The overlay sheets and the curable resin therein may be of any of a wide variety of acceptable materials, such as various heat curable resins, such as melamine, phenolic, epoxy, urea formaldehyde and others. Each of the overlay sheets is covered by a release sheet, and the release sheets in turn may be backed by a stack of padding sheets, such as sheets of kraft paper.

The resulting assembly is then placed in a molding press between a pair of cauls, and the assembly is heated and compressed between the cauls in a conventional manner until the resin is cured. Upon curing, the overlay sheets bond to the textured core and assume the texture of the core. The resulting laminate, which may be textured on one or both sides, is used as a molding caul to make textured decorative laminates, as hereinbefore described.

It should be understood that the method of imparting color highlights in accordance with the present invention is carried out as part of the formation of the textured decorative laminate. Color is applied to the decorative surface during the pressure molding procedure, and any excess color is removed from the textured surface after completion of the molding operation.

In carrying out the process of the present invention, a special release sheet is used and is an important feature of the invention. The release sheet to be used is first coated on one side with a pigment, and the pigmented side is placed against the decorative surface prior to the pressure forming of the textured laminate. The color of the pigment is preferably selected to be darker than the color of the decorative sheet or in any event is preferably of a contrasting or highlighting color.

Although any forms of pigment may be employed, the form of pigment used must lend itself to application to the release sheet. For this purpose, therefore, pigments carried in a solvent and binder system capable of being coated onto the release sheet and dried after application are preferred, such as printing inks. It is not necessary to apply the ink to the release sheet in accordance with any pattern, and in fact, a substantially uniform and unpatterned application is preferred to assure complete coverage of the decorative surface. Uniform coating of the ink onto the release sheet by conventional rotogravure methods has been found suitable for this purpose.

The material for the release sheet may be selected from any of the materials in common use and include foil, polymer films and treated paper films. Polypropylene film is especially preferred due to its ability to release the ink when placed under the heat and pressure conditions used in the laminating process.

The components of the decorative laminate, pigmented release sheet and textured caul are than assembled as a sandwich as aforesaid and are compressed in the aforesaid manner at sufficient pressures and temperatures to cause curing and bonding of the resin impregnated sheets. During the laminating process, the textured surface of the caul is imparted to the decorative surface, and at the same time, the release sheet conforms to the irregular surfaces and transfers pigment thereon substantially uniformly onto the decorative surface of the laminate. Upon curing, the release sheet is stripped away from the textured decorative surface, which is now substantially uniformly coated with the pigment.

Under high volume production conditions, it is preferable to use a caul plate having a textured surface on both sides, since an assembly of caul plates and resin impregnated paper assemblies may be compressed and heated simultaneously. For example, five cauls can be used in a single molding operation to produce ten decorative panels.

In the production of a simulated wood panel, wood grain print sheet is utilized, and a wood grain texture is imparted to the laminate. The pattern of the print sheet need not coincide with the texture pattern to produce the desired results, thus eliminating the problem of bringing the patterns into exact register.

The pigmented textured surface of the laminate is now subjected to an operation in which some or all of the pigment remaining on the embossed areas is removed from such areas of the surface while allowing a greater amount of pigment to remain in the debossed areas. This operation may be accomplished by surface rubbing or brushing, exposing the lighter shades of the raised grain or texture and enhancing a three dimensional shadow effect. A suitable procedure is to brush the textured surface with rotary bristle or tampico brushes, preferably in the direction of the grain pattern. Such apparatus in conventionally used in a dull rubbing operation to reduce the gloss of the decorative surface of laminates, and any equivalent procedure for mechanically removing the pigment from the high spots would be effective.

The pigment used preferably will be one having high adherence properties, but in any event it is believed that some of the pigment migrates into the resinous surface, particularly in the debossed areas which are subjected to the greatest molding pressure, and becomes bonded therein as the resin is cured.

The resulting laminate will thus have a textured surface with a greater concentration of pigment in the debossed areas than in the embossed areas. By means of the present invention, therefore, it is possible to create a variety of effects, particularly with the use of contrasting colors in the decorative surface and pigment.

What is claimed is:

1. Method of imparting color highlights to a textured decorative laminate, comprising the steps of making an assembly of heat curable resin impregnated sheets, placing a release sheet having a pigmented surface against an outer surface of said assembly wherein the pigmented surface is facing said outer surface, compressing and heating said assembly and release sheet under conditions to cure said resin and bond said assembly into a laminate while imparting texture to said outer surface and while causing transfer of pigment from the release sheet to the outer surface, and upon completion of the compression and heating operation, removing said release sheet from the cured laminate to expose the textured, pigmented surface, and then rubbing said surface to the extent necessary to remove more pigment from the raised areas than the depressed areas of said surface.

2. The method of claim 1 wherein the release sheet is polypropylene film.

3. The method of claim 2 wherein said pigment is liquid ink applied to said film and dried thereon.

4. The method of claim 3 wherein said ink is applied substantially uniformly to said film.

5. The method of claim 1 wherein rubbing the textured, pigmented surface comprises brushing with a rotary brush.

6. The method of claim 1 wherein said outer surface has a wood grain pattern printed thereon and said pigment is of a shade which contrasts with said outer surface.

7. Method of imparting highlights or shadows to a decorative laminate comprising the steps of preparing a textured decorative laminate by compression molding utilizing a pigmented release sheet to cause transfer of pigment to said laminate, and then rubbing the surface of the pigmented textured laminate to the extent necessary to remove some of the applied pigment, with more pigment being removed from the raised areas of the textured laminate than the depressed areas thereof.

8. In conjunction with the production of a decorative laminate having a textured outer surface wherein the laminate is formed by making an assembly comprising resin impregnated sheets, applying a release sheet over an outer surface of said assembly, and forming a laminate by heating and compressing said assembly between a pair of molding cauls, wherein one of said cauls has a textured surface facing said release sheet and serving to impart a textured finish to said outer surface, a method of imparting color highlights to the outer textured surface of said laminate, said method comprising the steps of providing said release sheet with a pigment coating facing said outer surface such that pigment is transferred from said release sheet to said outer surface during said heating and compressing step and while texture is being imparted to said outer surface, and upon formation of said laminate, removing the release sheet to expose the outer pigmented, textured surface, and rubbing said textured surface such that pigment is removed more from the raised areas than the depressed areas thereof.

* * * * *